United States Patent [19]

Kavanagh

[11] 3,732,644
[45] May 15, 1973

[54] FISHING ROD
[76] Inventor: Arthur Kavanagh, 393 West Palmer Avenue, Morrisville, Pa.
[22] Filed: Mar. 23, 1971
[21] Appl. No.: 127,272

[52] U.S. Cl..................................................43/22, 43/24
[51] Int. Cl.........................A01k 87/04, A01k 87/06
[58] Field of Search.......................................43/22, 24

[56] References Cited

UNITED STATES PATENTS

| 3,410,016 | 11/1968 | Arsenault | 43/22 |
| 2,296,174 | 9/1942 | Meisler | 43/24 |

*Primary Examiner*—Louis G. Mancene
*Assistant Examiner*—Daniel J. Leach
*Attorney*—Sperry & Zoda

[57] ABSTRACT

An improved fishing pole is provided with means for selectively mounting a fishing reel at various locations spaced circumferentially and longitudinally along the pole. The pole may be provided with line guide means having eyelets of different sizes and designs circumferentially arranged along the intermediate length of the pole to correspond with the location of the associated reel. A unique tip line guide may be provided which may be stationary or of a swivel nature. The improved fishing rod of the present invention enables a user to employ a single pole with various different types of fishing reels for meeting the needs dictated by the different types of fishing and the different types of terrain encountered during a fishing trip.

1 Claim, 5 Drawing Figures

PATENTED MAY 15 1973   3,732,644
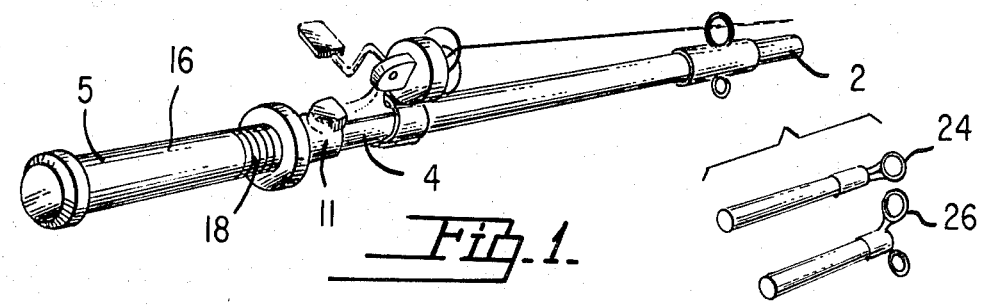
Fig. 1.
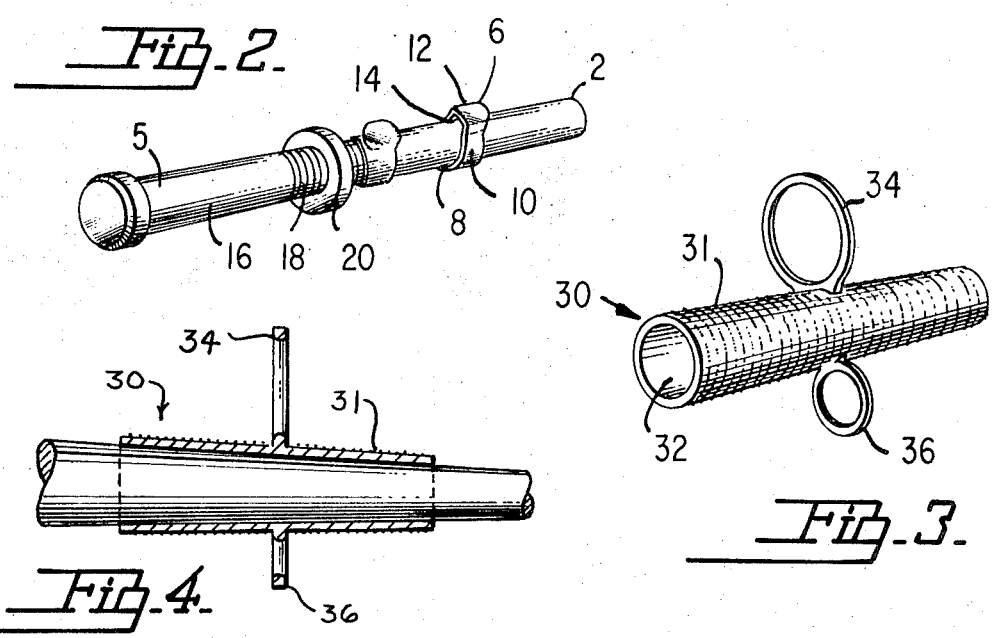
Fig. 2.
Fig. 3.
Fig. 4.
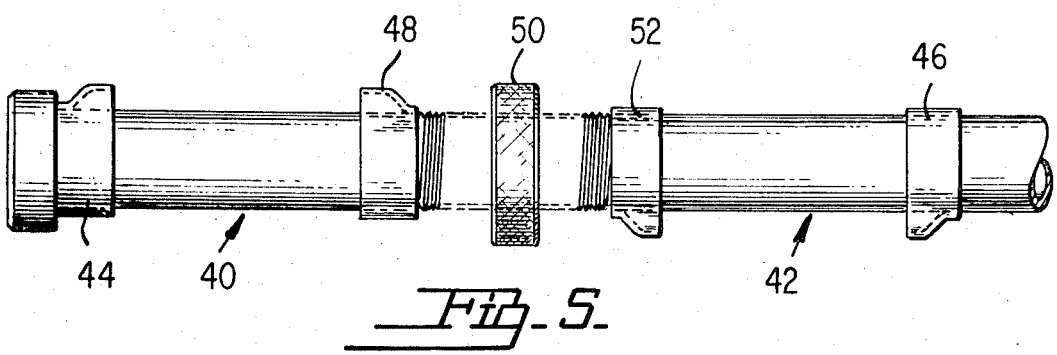
Fig. 5.
INVENTOR,
ARTHUR KAVANAGH
BY Sperry and Zoda
ATTORNEYS

FISHING ROD

BACKGROUND OF THE INVENTION

Several different types of fishing reels are often needed for use in different types of fishing. Thus, the conventional spool type reel may be preferred or satisfactory for fishing when using one type of bait or plug and under certain terrain conditions, as when casting from shore, or when a particular type of fish is running. Conversely, spinning or fly casting rigs may be desired or even necessary on other occasions or for other purposes.

Although the same fishing pole may be suitable for use under most circumstances and its balance and whip or other characteristics may be preferred, the line guides used for the line fed off from a spool type reel are not necessarily suitable for use when a spinning or fly casting reel is employed. Moreover, the reel mounts provided for different types of reels vary considerably. As a result, it is generally necessary for fishermen to have several different fishing poles and matching reels; no one of which and no combination of which are suitable for use under all fishing conditions and requirements encountered. While it may be a relatively simple matter to carry a variety of fishing reels through underbrush or even on a simple boat fishing expedition, it is considerably more difficult to carry a variety of fishing poles.

Therefore, it would be advantageous if a single fishing pole arrangement could be provided which may be used with a variety of fishing reels to meet the requirements of the various conditions presented by the entire spectrum of fishing activity.

THE PRESENT INVENTION

In accordance with the present invention, a single rod is provided for use selectively with a spool type reel or a spinning reel, or with a spinning type reel or a fly-casting reel; whichever combination may be desired or necessary on any occasion. In order to afford such alternative usage, multiple reel mounts are arranged longitudinally and/or circumferentially about the rod and line guides having different sizes or types of eyelets adapted for use with different types of reels are arranged circumferentially about the rod in positions corresponding to the positions of the various reel seats.

BRIEF DESCRIPTION OF THE DRAWINGS

While the invention is particularly pointed out and distinctly claimed in the concluding portion of the specification, a preferred embodiment is described in the following detailed description, which may be best understood when read in connection with the accompanying drawings in which:

FIG. 1 is a perspective view, generally illustrating a typical fishing rod according to the present invention;

FIG. 2 is an enlarged perspective view of a portion of the rod shown in FIG. 1, showing a multiple reel seat feature thereof;

FIG. 3 is a perspective view illustrating a preferred form of a line guide used intermediate the length of the rod shown in FIG. 1;

FIG. 4 is a longitudinal sectional view taken through the line guide shown in FIG. 3; and FIG. 5 is an elevation view of an alternative construction embodying the present invention.

PREFERRED EMBODIMENT OF THE PRESENT INVENTION

Referring now to the drawings in which like numerals are used to indicate like parts throughout the various views thereof, the preferred form of the invention chosen for purposes of illustration is shown generally in FIG. 1 as a fishing rod 2 provided with a cylindrical reel seat surface 4 disposed adjacent a butt end 5 of the rod. A plurality of reel mounting elements may be located near the forward end of the cylindrical end of the reel seat surface 4 as indicated, for example, at 6 and 8 (see FIG. 2). As shown, the reel mounting elements 6 may be carried by, or formed on, a band ring 10 fixedly secured on the rod adjacent the forward portion of the reel seat surface 4. The reel mounting element 6 is preferably formed by means of a raised or radially extending cup-like portion 12 formed on the band 10, which portion cooperates with the reel seat surface 4 to present a rearwardly facing arcuate cavity 14.

The size and shape of the cavity 14 is designed to receive the tang or forward end of the face of an appropriate fishing reel so as to afford a snug or frictional fit for holding the reel securely in place. The portion of the rod adjacent the rear end of the reel seat surface 4 may be provided with a complimentary reel mounting means 11 (See FIG. 1). The rear reel mounting means 11 may be loosely fitted about the cylindrical reel seat portion so as to freely slide longitudinally and circumferentially thereabout. Because of this arrangement, the rear mounting means need only present one cavity which may be swivelled into position to engage the rear tang portion of a reel of which the front tang portion is engaged in either of the fixed mounting elements 6 or 8.

The portion of the rod adjacent the butt end 5 thereof may have a portion 16, presenting threads 18 operatively engaged within a knurled ring 20 for urging the loose mounting elements 11 into engagement with the rear tang portion of a mounted reel. The threading of the knurled ring 20 is also operable to urge the front tang portion of the reel into frictional engagement within the fixed frontal cavity 14, so that the reel may be securely held in place on the reel seat surface 4 of the rod.

As shown in FIGS. 1 and 2, the mounting elements 6 and 8 may be radially aligned so as to present a relatively simple configuration for manufacturing purposes. Alternatively, the fixed mounting elements 6 and 8 may be longitudinally staggered to accommodate reels having significantly different tang lengths. Either configuration may be embodied within a fishing rod configuration without departing from the present invention.

In the construction illustrated in FIGS. 1 and 2, the rod is designed to permit the mounting of one type of reel, for example, a spool type reel (either plug caster or fly caster) on one side of the rod and, at another time, to permit the mounting of another or different type of reel, such as a spinning reel on another side of the rod. It is, therefore, possible to use the same rod with any selected reel so as to afford the best equipment needed on any occasion or to permit the changing of reels and line as the conditions change during a fishing trip.

While the assembly shown is designed to provide two circumferentially spaced reel mounting means on opposite sides of the rod, it will be readily apparent that three or four reel mounts may be provided on a single rod to accommodate various different types of reels or to receive reels loaded with line of different weight or character, as desired.

In order to permit proper and effective use of different types of reels, as for example, bait casting and spinning reels, it is necessary to provide the rod with line guide means suitable for use with the particular type of reel selected. Thus, the line guides used with spool type reels are ordinarily provided with eyelets that are of considerably smaller internal diameter than the eyelets used with spinning reels. The line guide further must be oriented circumferentially to axially align with the location of the reel mounting elements so that one type of line guide will be aligned on the rod with an associated selected reel mounting assembly, while a different type of line guide will be aligned on the rod with another associated reel mounting assembly. This arrangement is preferably accomplished by providing a single unitary line guiding means adapted to be mounted on the rod with a plurality of radially projecting members arranged to correspond in location with the position of the associated reel mounting means. The various projections may then be provided with line guiding eyelets of suitable diameter to afford the most effective guiding and low friction support for the line passing from the reel.

As shown in FIGS. 3 and 4, the line guiding means is preferably formed as a unitary body 30, consisting of a material such as plastic (molded to simulate thread windings 31). The body 30 may be formed with a central passage 32 formed therethrough and tapered to correspond to the taper of a conventional fishing rod. The body 30 may then be slipped over the end of the rod 2 so that the body will take up a suitable position intermediate the length of the rod and appropriately spaced from the reel seating surface 4.

The line guiding means may be formed with a plurality of radially extending eyelets such as those indicated as 34 and 36. These eyelets each present a circular guide for directing the passage of a fishing line from a reel therethrough. The eyelet 34 is shown as having a relatively large internal diameter corresponding to that which has been found most satisfactory for use with spinning reels. Conversely, the eyelet 36 presents a smaller diameter corresponding to that commonly used with spool type reels (either fly or bait casting).

The eyelets 34 and 36 carried by the body 30 of the line guiding means are circumferentially oriented and arranged to align axially with the orientation and arrangement of the reel mounting means on the rod so that the user may employ whichever type of reel he may require for any fishing condition encountered and may thereby have the correct type of line guide properly positioned in alignment therewith.

A tip line guide may be provided having one or a plurality of prong supports. The guides 24 and 26 shown in FIG. 1 illustrate this feature. The tip guide 24 is provided with two support members; whereas, the eyelets of the tip guide means 26 are supported by one prong each. The plurality of eyelets, as shown in association with tip guide 26, may be provided to extend radially from the tip and may be positioned to correspond axially with associated guides 34 and 36. Alternatively, one eyelet guide may be swivel mounted on the tip to accommodate any circumferential position taken by the intermediate guides 34 and 36.

FIG. 5 shows one form of the invention wherein the reel mounts are longitudinally spaced so as to be particularly adaptable for use with a fly rod reel at a rear station 40 or a spinning reel in a forward station 42. It will be, of course, understood that when the rear station 40 is used with a fly rod, the forward station 42 then becomes the handle. Conversely, when the forward station 42 is used to mount the spinning reel, the rear station 40 becomes the handle.

The embodiment shown in FIG. 5 is provided with a rear fixed mounting element 44 and a forward fixed mounting element 46. A first, loosely supported mounting element 48, associated with fixed mounting element 44 is disclosed on one side of a threaded knurled ring 50. A second loosely fitting mounting element 52 is disposed on the other side of the threaded knurled ring 50 and is associated with the fixed mounting element 46. It will be observed, that the threaded, knurled ring 50 may be operated to urge the movable mounting element 48 toward the fixed associated mounting element 44 to engage a reel therebetween; or, may be used to urge the movable mounting element 52 toward the fixed mounting element 46 to engage a spinning reel therebetween.

SCOPE OF THE INVENTION

Although several embodiments of the present invention have been shown in the foregoing specification, it will, of course, be understood that various modifications and changes may be made therein without departing from the invention. It is, therefore, intended that the following claim cover all such modifications and changes as may fall within the true spirit and scope of the present invention.

I claim:

1. A fishing rod having a cylindrical surface thereon for receiving and supporting the base of a reel, a plurality of reel base engaging elements located at one end of said cylindrical surface and at circumferentially spaced points about said surface, other reel base engaging means located near the other end of said cylindrical surface and movable to secure a reel in a predetermined circumferential position on said rod, line guide means on said rod spaced longitudinally from said cylindrical surface, said line guide means having a plurality of eyelets of different diameters circumferentially spaced about said rod in positions corresponding to the location of said spaced points on the cylindrical surface for guiding a line removed from a reel secured to said rod by a selected one of said reel base engaging elements.

* * * * *